US010579282B1

(12) United States Patent
Baruch et al.

(10) Patent No.: US 10,579,282 B1
(45) Date of Patent: Mar. 3, 2020

(54) DISTRIBUTED COPY IN MULTI-COPY REPLICATION WHERE OFFSET AND SIZE OF I/O REQUESTS TO REPLICATION SITE IS HALF OFFSET AND SIZE OF I/O REQUEST TO PRODUCTION VOLUME

(71) Applicant: EMC Corporation, Hopkinton, MA (US)

(72) Inventors: Leehod Baruch, Rishon Leziyon (IL); Assaf Natanzon, Tel Aviv (IL); Jehuda Shemer, Kfar Saba (IL); Amit Lieberman, Raanana (IL); Ron Bigman, Holon (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 293 days.

(21) Appl. No.: 15/085,148

(22) Filed: Mar. 30, 2016

(51) Int. Cl.
*G06F 3/06* (2006.01)

(52) U.S. Cl.
CPC ............ *G06F 3/0619* (2013.01); *G06F 3/065* (2013.01); *G06F 3/0665* (2013.01); *G06F 3/0689* (2013.01)

(58) Field of Classification Search
CPC ...... G06F 3/0619; G06F 3/065; G06F 3/0665; G06F 3/0689
USPC ........ 711/114, 162, 170; 707/626, 634, 781, 707/803, 812; 710/61, 74; 712/28, 36, 712/220, 225
See application file for complete search history.

(56) References Cited

U.S. PATENT DOCUMENTS

| | | | |
|---|---|---|---|
| 5,170,480 A | 12/1992 | Mohan et al. | |
| 5,249,053 A | 9/1993 | Jain | |
| 5,388,254 A | 2/1995 | Betz et al. | |
| 5,499,367 A | 3/1996 | Bamford et al. | |
| 5,526,397 A | 6/1996 | Lohman | |
| 5,860,091 A * | 1/1999 | DeKoning | G06F 3/0626 711/113 |
| 5,864,837 A | 1/1999 | Maimone | |
| 5,879,459 A | 3/1999 | Gadgil et al. | |
| 5,990,899 A | 11/1999 | Whitten | |
| 6,042,652 A | 3/2000 | Hyun et al. | |
| 6,065,018 A | 5/2000 | Beier et al. | |
| 6,143,659 A | 11/2000 | Leem | |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Response to U.S. Non-Final Office Action dated Oct. 18, 2017 for U.S. Appl. No. 15/085,123; Response filed Jan. 17, 2018; 4 Pages.

(Continued)

*Primary Examiner* — Ann J Lo
*Assistant Examiner* — Chie Yew
(74) *Attorney, Agent, or Firm* — Daly, Crowley Mofford & Durkee, LLP

(57) ABSTRACT

In one embodiment, a method includes replicating a production volume on a plurality of replica volume portions. Each replica volume portion is stored on a respective storage array with a respective journal. The replicating includes distributing data from a write command to a production volume across the replica volume portions using a coding scheme. A subset of replica volume portions, less than a total number of replica volume portions, includes data for a full replica volume of the production volume.

18 Claims, 6 Drawing Sheets

(56) References Cited

U.S. PATENT DOCUMENTS

| | | |
|---|---|---|
| 6,148,340 A | 11/2000 | Bittinger et al. |
| 6,174,377 B1 | 1/2001 | Doering et al. |
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,725,392 B1 * | 4/2004 | Frey .................. G06F 11/1076 714/15 |
| 6,804,676 B1 | 10/2004 | Bains, II |
| 6,947,981 B2 | 9/2005 | Lubbers et al. |
| 7,043,610 B2 | 5/2006 | Horn et al. |
| 7,051,126 B1 | 5/2006 | Franklin |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,285 B2 * | 4/2008 | Bai .................. H04L 69/40 370/237 |
| 7,353,335 B2 | 4/2008 | Kawamura |
| 7,360,113 B2 | 4/2008 | Anderson et al. |
| 7,426,618 B2 | 9/2008 | Vu et al. |
| 7,464,126 B2 * | 12/2008 | Chen .................. G06F 11/2064 707/655 |
| 7,519,625 B2 | 4/2009 | Honami et al. |
| 7,519,628 B1 | 4/2009 | Leverett |
| 7,546,485 B2 | 6/2009 | Cochran et al. |
| 7,590,887 B2 | 9/2009 | Kano |
| 7,606,940 B2 | 10/2009 | Yamagami |
| 7,719,443 B1 | 5/2010 | Natanzon |
| 7,757,057 B2 | 7/2010 | Sangapu et al. |
| 7,797,358 B1 * | 9/2010 | Ahal .................. G06F 11/1471 707/823 |
| 7,840,536 B1 | 11/2010 | Ahal et al. |
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Heller et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 * | 9/2014 | Natanzon .................. G06F 3/065 711/112 |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |

(56) References Cited

U.S. PATENT DOCUMENTS

| | | |
|---|---|---|
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,678,680 B1 | 6/2017 | Natanzon et al. |
| 9,684,576 B1 | 6/2017 | Natanzon et al. |
| 9,696,939 B1 | 7/2017 | Frank et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 10,108,356 B1 | 10/2018 | Natanzon et al. |
| 10,108,507 B1 | 10/2018 | Natanzon |
| 10,108,645 B1 | 10/2018 | Bigman et al. |
| 10,114,581 B1 | 10/2018 | Natanzon et al. |
| 10,120,787 B1 | 11/2018 | Shemer et al. |
| 10,120,925 B1 | 11/2018 | Natanzon et al. |
| 10,126,946 B1 | 11/2018 | Natanzon et al. |
| 10,133,874 B1 | 11/2018 | Natanzon et al. |
| 10,140,039 B1 | 11/2018 | Baruch et al. |
| 10,146,436 B1 | 12/2018 | Natanzon et al. |
| 10,146,639 B1 | 12/2018 | Natanzon et al. |
| 10,146,675 B1 | 12/2018 | Shemer et al. |
| 10,146,961 B1 | 12/2018 | Baruch et al. |
| 10,148,751 B1 | 12/2018 | Natanzon |
| 10,152,246 B1 | 12/2018 | Lieberman et al. |
| 10,152,267 B1 | 12/2018 | Ayzenberg et al. |
| 10,152,384 B1 | 12/2018 | Amit et al. |
| 10,157,014 B1 | 12/2018 | Panidis et al. |
| 10,185,583 B1 | 1/2019 | Natanzon et al. |
| 10,191,677 B1 | 1/2019 | Natanzon et al. |
| 10,191,687 B1 | 1/2019 | Baruch et al. |
| 10,191,755 B1 | 1/2019 | Natanzon et al. |
| 10,203,904 B1 | 2/2019 | Natanzon et al. |
| 10,210,073 B1 | 2/2019 | Baruch et al. |
| 10,223,007 B1 | 3/2019 | Natanzon et al. |
| 10,223,023 B1 | 3/2019 | Natanzon et al. |
| 10,223,131 B1 | 3/2019 | Lieberman et al. |
| 10,229,006 B1 | 3/2019 | Natanzon et al. |
| 10,229,056 B1 | 3/2019 | Panidis et al. |
| 10,235,055 B1 | 3/2019 | Saad et al. |
| 10,235,060 B1 | 3/2019 | Baruch et al. |
| 10,235,061 B1 | 3/2019 | Natanzon et al. |
| 10,235,064 B1 | 3/2019 | Natanzon et al. |
| 10,235,087 B1 | 3/2019 | Baruch et al. |
| 10,235,088 B1 | 3/2019 | Baruch et al. |
| 10,235,090 B1 | 3/2019 | Baruch et al. |
| 10,235,091 B1 | 3/2019 | Ayzenberg et al. |
| 10,235,092 B1 | 3/2019 | Natanzon et al. |
| 10,235,145 B1 | 3/2019 | Natanzon et al. |

(56) References Cited

U.S. PATENT DOCUMENTS

| | | | |
|---|---|---|---|
| 10,235,196 | B1 | 3/2019 | Natanzon et al. |
| 10,235,247 | B1 | 3/2019 | Natanzon et al. |
| 10,235,249 | B1 | 3/2019 | Natanzon et al. |
| 10,235,252 | B1 | 3/2019 | Lieberman et al. |
| 10,250,679 | B1 | 4/2019 | Natanzon et al. |
| 10,255,137 | B1 | 4/2019 | Panidis et al. |
| 10,255,291 | B1 | 4/2019 | Natanzon et al. |
| 2002/0129168 | A1 | 9/2002 | Kanai et al. |
| 2003/0033477 | A1* | 2/2003 | Johnson ............ G06F 3/0601 711/114 |
| 2003/0048842 | A1 | 3/2003 | Fourquin et al. |
| 2003/0061537 | A1 | 3/2003 | Cha et al. |
| 2003/0110278 | A1 | 6/2003 | Anderson |
| 2003/0145317 | A1 | 7/2003 | Chamberlain |
| 2003/0196147 | A1 | 10/2003 | Hirata et al. |
| 2004/0103260 | A1* | 5/2004 | Nalawadi ............ G06F 3/0605 711/173 |
| 2004/0205092 | A1 | 10/2004 | Longo et al. |
| 2004/0250032 | A1 | 12/2004 | Ji et al. |
| 2004/0254964 | A1 | 12/2004 | Kodama et al. |
| 2005/0015663 | A1 | 1/2005 | Armangau et al. |
| 2005/0028022 | A1 | 2/2005 | Amano |
| 2005/0049924 | A1 | 3/2005 | DeBettencourt et al. |
| 2005/0172092 | A1 | 8/2005 | Lam et al. |
| 2005/0273655 | A1 | 12/2005 | Chow et al. |
| 2006/0031647 | A1 | 2/2006 | Hirakawa et al. |
| 2006/0047996 | A1 | 3/2006 | Anderson et al. |
| 2006/0064416 | A1 | 3/2006 | Sim-Tang |
| 2006/0107007 | A1 | 5/2006 | Hirakawa et al. |
| 2006/0117211 | A1 | 6/2006 | Matsunami et al. |
| 2006/0161810 | A1 | 7/2006 | Bao |
| 2006/0179343 | A1 | 8/2006 | Kitamura |
| 2006/0195670 | A1 | 8/2006 | Iwamura et al. |
| 2007/0055833 | A1 | 3/2007 | Vu et al. |
| 2007/0180304 | A1 | 8/2007 | Kano |
| 2007/0198602 | A1 | 8/2007 | Ngo et al. |
| 2007/0198791 | A1 | 8/2007 | Iwamura et al. |
| 2007/0226535 | A1 | 9/2007 | Gokhale |
| 2008/0010422 | A1* | 1/2008 | Suzuki ............ G06F 11/1471 711/162 |
| 2008/0082592 | A1 | 4/2008 | Ahal et al. |
| 2009/0037608 | A1* | 2/2009 | Lubbers ............ G06F 3/0626 710/5 |
| 2010/0281215 | A1* | 11/2010 | Pidapa ............ G06F 11/1469 711/114 |
| 2012/0254535 | A1* | 10/2012 | Hay ............ G06F 11/1456 711/114 |
| 2012/0278689 | A1* | 11/2012 | Tamo ............ G06F 11/1092 714/805 |
| 2013/0054529 | A1* | 2/2013 | Wang ............ G06F 11/1448 707/639 |
| 2015/0039815 | A1* | 2/2015 | Klein ............ G06F 12/0246 711/103 |
| 2015/0169252 | A1* | 6/2015 | Krishnamurthi ...... G06F 3/0644 711/114 |
| 2015/0207522 | A1* | 7/2015 | Anderson ............ G06F 11/1076 714/758 |
| 2016/0202925 | A1* | 7/2016 | Dain ............ G06F 3/0619 714/6.22 |
| 2017/0123921 | A1* | 5/2017 | Ptak ............ G06F 11/1096 |

OTHER PUBLICATIONS

Gibson, "Five Point Plan Lies at the Heart of Compression Technology;" Tech Talk; Apr. 29, 1991; 1 Page.

Soules et al., "Metadata Efficiency in Versioning File Systems;" 2$^{nd}$ USENIX Conference on File and Storage Technologies; Mar. 31, 2003-Apr. 2, 2003; 16 Pages.

AIX System Management Concepts: Operating Systems and Devices; Bull Electronics Angers; May 2000; 280 Pages.

Soules et al., "Metadata Efficiency in a Comprehensive Versioning File System;" May 2002; CMU-CS-02-145; School of Computer Science, Carnegie Mellon University; 33 Pages.

"Linux Filesystems," Sams Publishing; 2002; Chapter 1: Introduction to Filesystems pp. 17-22 and Chapter 3: Overview of Journaling Filesystems pp. 67-71; 12 Pages.

Bunyan et al., "Multiplexing in a BrightStor® ARCserve® Backup Release 11;" Mar. 2004; 4 Pages.

Marks, "Network Computing, 33;" Cover Story; Feb. 2, 2006; 8 Pages.

Hill, "Network Computing, NA;" Cover Story; Jun. 8, 2006; 9 Pages.

Microsoft Computer Dictionary, Fifth Edition; 2002; 3 Pages.

Wikipedia; Retrieved on Mar. 29, 2011 from http://en.wikipedia.org/wiki/DEFLATE: DEFLATE; 6 Pages.

Wikipedia; Retrieved on Mar. 29, 2011 from http://en.wikipedia.org/wiki/Huffman_coding: Huffman Coding; 11 Pages.

Wikipedia; Retrieved on Mar. 29, 2011 from http:///en.wikipedia.org/wiki/LZ77: LZ77 and LZ78; 2 Pages.

U.S. Appl. No. 11/609,560 downloaded Jan. 7, 2015; 265 Pages.
U.S. Appl. No. 12/057,652 downloaded Jan. 7, 2015; 296 Pages.
U.S. Appl. No. 11/609,561 downloaded Jan. 7, 2015; 219 Pages.
U.S. Appl. No. 11/356,920 downloaded Jan. 7, 2015; 272 Pages.
U.S. Appl. No. 10/512,687 downloaded Jan. 7, 2015; 300 Pages.
U.S. Appl. No. 10/512,687 downloaded Jan. 7, 2015; 254 Pages.
U.S. Appl. No. 11/536,233 downloaded Jan. 7, 2015; 256 Pages.
U.S. Appl. No. 11/536,215 downloaded Jan. 7, 2015; 172 Pages.
U.S. Appl. No. 11/536,160 downloaded Jan. 7, 2015; 230 Pages.
U.S. Appl. No. 11/964,168 downloaded Jan. 7, 2015; 222 Pages.
U.S. Non-Final Office Action dated Oct. 18, 2017 for U.S. Appl. No. 15/085,123; 23 pages.
U.S. Final Office Action dated Apr. 4, 2018 for U.S. Appl. No. 15/085,123; 19 pages.
RCE and Response to Final Office Action dated Apr. 4, 2018 for U.S. Appl. No. 15/085,123, filed Aug. 24, 2018; 14 Pages.
U.S. Appl. No. 14/496,783, filed Sep. 25, 2014, Natanzon et al.
U.S. Appl. No. 14/496,790, filed Sep. 25, 2014, Cohen et al.
U.S. Appl. No. 14/559,036, filed Dec. 3, 2014, Natanzon et al.
U.S. Appl. No. 14/753,389, filed Jun. 29, 2015, Nir et al.
U.S. Appl. No. 14/976,719, filed Dec. 21, 2015, Natanzon.
U.S. Appl. No. 14/978,378, filed Dec. 22, 2015, Bigman et al.
U.S. Appl. No. 15/085,148, filed Mar. 30, 2016, Baruch et al.
U.S. Appl. No. 15/274,362, filed Sep. 23, 2016, Baruch et al.
U.S. Appl. No. 15/275,758, filed Sep. 26, 2016, Natanzon et al.
U.S. Appl. No. 15/275,756, filed Sep. 26, 2016, Natanzon et al.
U.S. Appl. No. 15/379,940, filed Dec. 15, 2016, Baruch et al.
U.S. Appl. No. 15/386,754, filed Dec. 21, 2016, Shemer et al.
U.S. Appl. No. 15/380,013, filed Dec. 15, 2016, Baruch et al.
U.S. Appl. No. 15/390,996, filed Dec. 27, 2016, Natanzon et al.
U.S. Appl. No. 15/391,030, filed Dec. 27, 2016, Shemer et al.
U.S. Appl. No. 15/970,243, filed May 3, 2018, Schneider et al.
U.S. Appl. No. 16/052,037, filed Aug. 1, 2018, Schneider et al.
U.S. Appl. No. 16/048,763, filed Jul. 30, 2018, Schneider et al.
U.S. Appl. No. 16/050,400, filed Jul. 31, 2018, Alkaay et al.
U.S. Appl. No. 16/179,295, filed Nov. 2, 2018, Natanzon at al.
U.S. Appl. No. 16/261,174, filed Jan. 29, 2019, Natanzon at al.
U.S. Appl. No. 16/368,008, filed Mar. 28, 2019, Natanzon at al.
Notice of Allowance dated Jan. 2, 2019 for U.S. Appl. No. 15/085,123; 11 Pages.

* cited by examiner

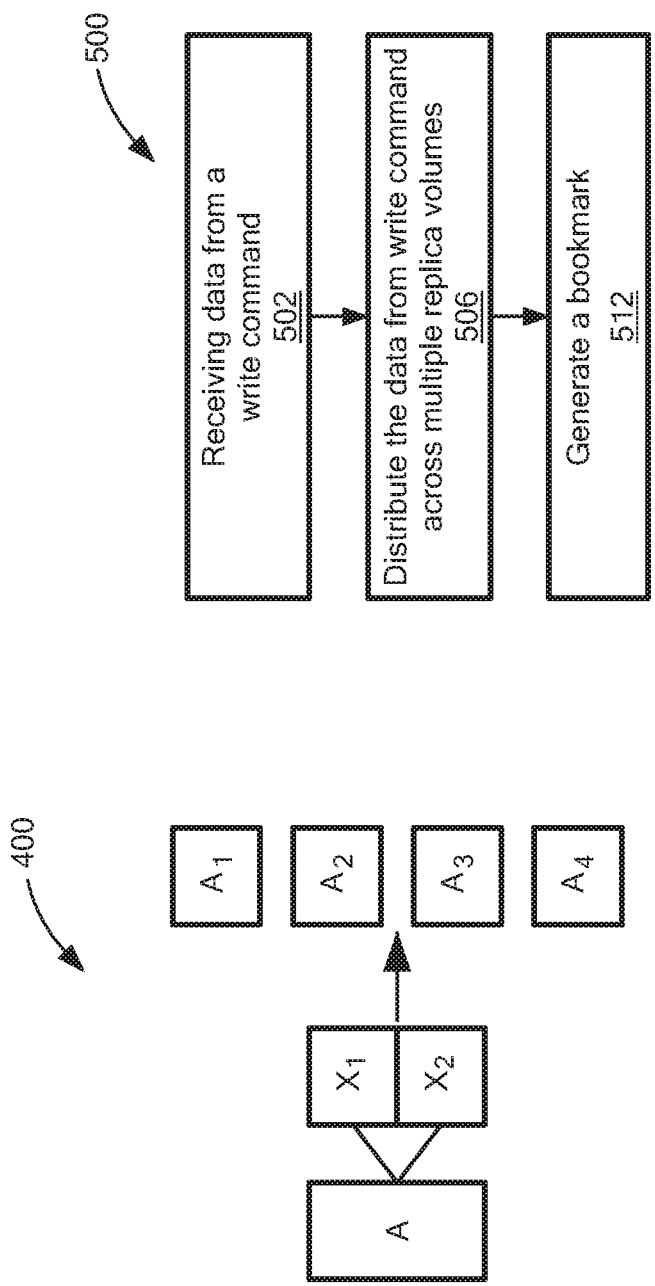

US 10,579,282 B1

DISTRIBUTED COPY IN MULTI-COPY REPLICATION WHERE OFFSET AND SIZE OF I/O REQUESTS TO REPLICATION SITE IS HALF OFFSET AND SIZE OF I/O REQUEST TO PRODUCTION VOLUME

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one embodiment, a method includes replicating a production volume on a plurality of replica volume portions. In an embodiment, each replica volume portion is stored on a respective storage array with a respective journal. In an embodiment, the replicating includes distributing data from a write command to a production volume across the replica volume portions using a coding scheme. In an embodiment, a subset of replica volume portions, less than a total number of replica volume portions, include data for a full replica volume of the production volume.

In another embodiment, an apparatus includes electronic hardware circuitry configured to replicate a production volume on a plurality of replica volume portions. In an embodiment, each replica volume portion is stored on a respective storage array with a respective journal. In an embodiment, the circuitry configured to replicate the production volume includes circuitry configured to distribute data from a write command to a production volume across the replica volume portions using a coding scheme. In an embodiment, a subset of replica volume portions, less than a total number of replica volume portions, includes data for a full replica volume of the production volume. In an embodiment, the circuitry includes at least one of a processor, a memory, a programmable logic device or a logic gate.

In a further embodiment, an article includes a non-transitory computer-readable medium that stores computer-executable instructions. In an embodiment, the instructions cause a machine to replicate a production volume on a plurality of replica volume portions. In an embodiment, each replica volume portion is stored on a respective storage array with a respective journal. In an embodiment, the instructions causing the machine to replicate the production volume include instructions causing the machine to distribute data from a write command to a production volume across the replica volume portions using a coding scheme. In an embodiment, a subset of replica volume portions, less than a total number of replica volume portions, includes data for a full replica volume of the production volume.

BRIEF DESCRIPTION OF THE DRAWINGS

FIG. 4 is a simplified block diagram of one particular example to perform multi-copy replication, according to one embodiment of the disclosure.

FIG. 5 is a flowchart of an example of a process to perform multi-copy replication, according to one embodiment of the disclosure.

DETAILED DESCRIPTION

In certain embodiments, the current disclosure may enable techniques to perform multi-copy replication. In one particular example, a volume is replicated to multiple locations using a coding process which may include, for example, erasure codes and RAID (Redundant Array of Independent Disks) storage techniques that a subset of the multi-copies may be used to access any data in the volume.

While the description herein describes techniques to replicate a volume, in certain embodiments techniques described herein may be applied to multiple volumes such as, for example, to replicate a logical unit that includes one or more volumes. In one particular example, the techniques described herein may be used to replicate of a virtual machine.

Figure 1:
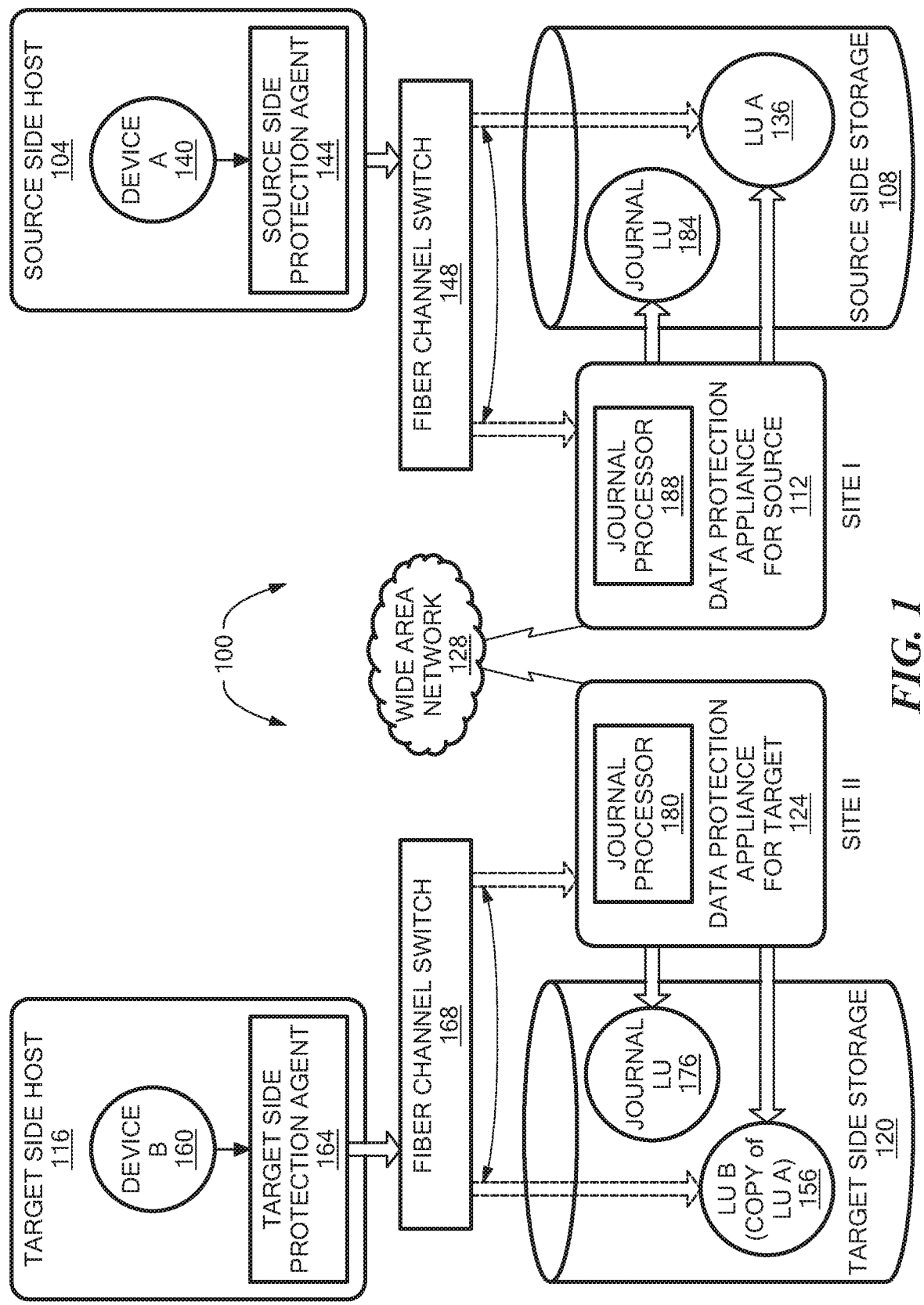
FIG. 1 is a block diagram of an example of a data protection system, according to an embodiment of the disclosure.

Referring to the example embodiment of FIG. 1, according to one embodiment of the disclosure, a data protection system 100 may include two sites; Site I, which may be a production site, and Site II, which may be a backup site or replica site. Under normal operation the production site may be the source side of system 100, and the backup site may be the target side of the system. The backup site may be responsible for replicating production site data. The backup site may enable roll back of Site I data to an earlier pointing time, which may be used in the event of data corruption of a disaster, or alternatively in order to view or to access data from an earlier point in time.

FIG. 1 is an overview of a physical or virtual system for data replication of either physical or virtual logical units. Thus, one of ordinary skill in the art would appreciate that in a virtual environment a hypervisor, in one example, may consume logical units and may generate a distributed file system on the logical units such as VMFS, for example, generates files in the file system and exposes the files as logical units to the virtual machines (each virtual machine disk is seen as a SCSI device by virtual hosts). In another example, the hypervisor may consume a network based file system and exposes files in the NFS as SCSI devices to virtual hosts.

In the embodiment of FIG. 1, during normal operations, the direction of replicate data flow may go from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II may behave as a production site for a portion of stored data, and may behave simultaneously as a backup site for another portion of stored data. In some data architectures, a portion of stored data may be replicated to a backup site, and another portion may not.

The production site and the backup site may be remote from one another, or they may both be situated at a common site, local to one another. Local data protection has the advantage of minimizing data lag between target and source, and remote data protection has the advantage of being robust in the event that a disaster occurs at the source side.

The source and target sides may communicate via a wide area network (WAN) 128, for example, although other types of networks may be used.

In the example embodiment of FIG. 1, each side of system 100 may include three major components coupled via a storage area network (SAN); namely, (i) a storage system, (ii) a host computer, and (iii) a data protection appliance (DPA). Specifically, with reference to FIG. 1, the source side SAN may include a source host computer 104, a source storage system 108, and a source DPA 112. Similarly, the target side SAN may include a target host computer 116, a target storage system 120, and a target DPA 124. As well, the protection agent (sometimes referred to herein and in the art as a splitter) may run on the host, or on the storage, or in the network or at a hypervisor level, and that DPAs are optional and DPA code may run on the storage array too, or the DPA 124 may run as a virtual machine.

Generally, a SAN may include one or more devices, referred to as "nodes". A node in a SAN may be an "initiator" or a "target", or both. An initiator node may be a device that is able to initiate requests to one or more other devices; and a target node may be a device that is able to reply to requests, such as SCSI (small computer system interface) commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using SCSI commands.

System 100 may include source storage system 108 and target storage system 120. Each storage system may include physical storage units for storing data, such as disks or arrays of disks. Typically, storage systems 108 and 120 may be target nodes. In order to enable initiators to send requests to storage system 108, storage system 108 may expose one or more logical units (LU) to which commands are issued. Thus, storage systems 108 and 120 may be SAN entities that provide multiple logical units for access by multiple SAN initiators.

Logical units may be a logical entity provided by a storage system, for accessing data stored in the storage system. The logical unit may be a physical logical unit or a virtual logical unit. A logical unit may be identified by a unique logical unit number (LUN). Storage system 108 may expose a logical unit 136, designated as LU A, and storage system 120 may expose a logical unit 156, designated as LU B.

LU B may be used for replicating LU A. As such, LU B may be generated as a copy of LU A. In one embodiment, LU B may be configured so that its size is identical to the size of LU A. Thus, for LU A, storage system 120 may serve as a backup for source side storage system 108. Alternatively, as mentioned hereinabove, some logical units of storage system 120 may be used to back up logical units of storage system 108, and other logical units of storage system 120 may be used for other purposes. Moreover, there may be symmetric replication whereby some logical units of storage system 108 may be used for replicating logical units of storage system 120, and other logical units of storage system 120 may be used for replicating other logical units of storage system 108.

System 100 may include a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally, a host computer may run at least one data processing application, such as a database application and an e-mail server.

Generally, an operating system of a host computer may generate a host device for each logical unit exposed by a storage system in the host computer SAN. A host device may be a logical entity in a host computer, through which a host computer may access a logical unit. Host device 104 may identify LU A and may generate a corresponding host device 140, designated as Device A, through which the host device 104 may access LU A. Similarly, host computer 116 may identify LU B and may generate a corresponding device 160, designated as Device B.

In the course of continuous operation, host computer 104 may be a SAN initiator that issues I/O requests (write/read operations) through host device 140 to LU A using, for example, SCSI commands. An I/O request is an input/output request (sometimes referred to as an I/O), which may be a read I/O request (sometimes referred to as a read request or a read) or a write I/O request (sometimes referred to as a write request or a write). Such requests may be generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); (e.g., 20 blocks). For an I/O rate of 50 megabytes (MB) per second, this corresponds to approximately 5,000 write transactions per second. System 100 may include two data protection appliances, a source side DPA 112 and a target side DPA 124. A DPA may perform various data protection services, such as data replication of a storage system, and journaling of I/O requests issued by a host computer to source side storage system data. As explained in detail herein, when acting as a target side DPA, a DPA may also enable roll back of data to an earlier point-in-time (PIT), and processing of rolled back data at the target site. Each DPA 112 and 124 may be a computer that includes inter alia one or more conventional CPUs and internal memory.

For additional safety precaution, each DPA may be a cluster of such computers. Use of a cluster may ensure that if a DPA computer is down, then the DPA functionality switches over to another computer. The DPA computers within a DPA cluster may communicate with one another using at least one communication link suitable for data transfer via fiber channel or IP based protocols, or such other transfer protocol. One computer from the DPA cluster may serve as the DPA leader. The DPA cluster leader may coordinate between the computers in the cluster, and may also perform other tasks that require coordination between the computers, such as load balancing.

In the architecture illustrated in FIG. 1, DPA 112 and DPA 124 may be standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 may be configured to act as initiators in the SAN (e.g., DPAs may issue I/O requests using, for example, SCSI commands, to access logical units on their respective storage systems). DPA 112 and DPA 124 may also be configured with the necessary functionality to act as targets (e.g., to reply to I/O requests, such as SCSI commands, issued by other initiators in the SAN, including inter alia their respective host computers 104 and 116). Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 may include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 may be drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode in accordance with embodiments of the current disclosure.

In production mode DPA 112 may act as a source site DPA for LU A. Thus, protection agent 144 may be configured to act as a source side protection agent (e.g., as a splitter for host device A). Specifically, protection agent 144 may replicate SCSI I/O write requests. A replicated SCSI I/O write request may be sent to DPA 112. After receiving an acknowledgement from DPA 124, protection agent 144 then may send the SCSI I/O write request to LU A. After receiving a second acknowledgement from storage system 108 host computer 104 may acknowledge that an I/O command complete.

When DPA 112 receives a replicated SCSI write request from data protection agent 144, DPA 112 may transmit certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 may send each write transaction to DPA 124, may receive back an acknowledgement from DPA 124, and in turns may send an acknowledgement back to protection agent 144. Protection agent 144 may wait until receipt of such acknowledgement before sending the SCSI write request to LU A.

In asynchronous mode, DPA 112 may send an acknowledgement to protection agent 144 upon receipt of each I/O request, before receiving an acknowledgement back from DPA 124.

In snapshot mode, DPA 112 may receive several I/O requests and combines them into an aggregate "snapshot" of write activity performed in the multiple I/O requests, and may send the snapshot to DPA 124, for journaling and for incorporation in target storage system 120. In snapshot mode DPA 112 may send an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 may receive replicated data of LU A from DPA 112, and may perform journaling and writing to storage system 120. When applying write operations to storage system 120, DPA 124 may act as an initiator, and may send SCSI commands to LU B.

During a recovery mode, DPA 124 may undo the write transactions in the journal, so as to restore storage system 120 to the state it was at, at an earlier time.

As described hereinabove, LU B may be used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 may act as a target site protection agent for host Device B and may fail I/O requests sent from host computer 116 to LU B through host Device B.

Target storage system 120 may expose a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 may include a journal processor 180 for managing the journal LU 176.

Journal processor 180 functions generally to manage the journal entries of LU B. Specifically, journal processor 180 may enter write transactions received by DPA 124 from DPA 112 into the journal, by writing them into the journal LU, may read the undo information for the transaction from LU B, may update the journal entries in the journal LU with undo information, applies the journal transactions to LU B, and may remove already-applied transactions from the journal.

Figure 2:
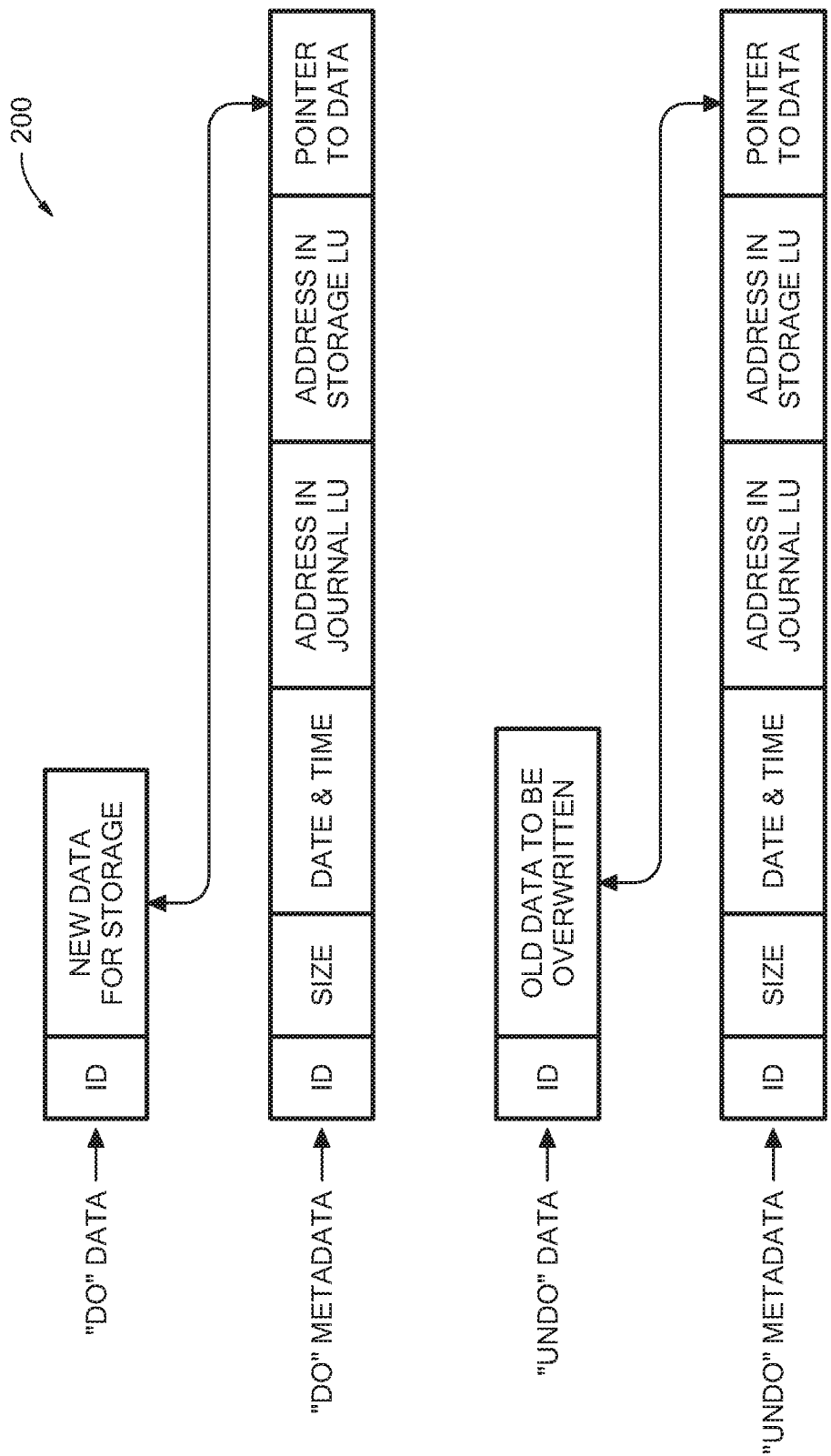
FIG. 2 is an illustration of an example of a journal history of write transactions for a storage system, according to an embodiment of the disclosure.

Referring to the example embodiment of FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

In one example, a description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Referring back to the example embodiment of FIG. 2, write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 may be transmitted from source side DPA 112 to target side DPA 124. As shown in FIG. 2, DPA 124 may record the write transaction 200 in the journal that includes four streams. A first stream, referred to as a DO stream, may include new data for writing in LU B. A second stream, referred to as a DO METADATA stream, may include metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, may include old data that was overwritten in LU B; and a fourth stream, referred to as an UNDO METADATA, may include an identifier, a date & time, a write size, a beginning address in LU B where data was to be overwritten, and a pointer to the offset in the UNDO stream where the corresponding old data is located.

In practice each of the four streams may hold a plurality of write transaction data. As write transactions are received dynamically by target DPA 124, the write transactions may be recorded at the end of the DO stream and the end of the DO METADATA stream, prior to committing the transaction. During transaction application, when the various write transactions are applied to LU B, prior to writing the new DO data into addresses within the storage system, the older data currently located in such addresses may be recorded into the UNDO stream. In some examples, the metadata stream (e.g., UNDO METADATA stream or the DO META-DATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3A:
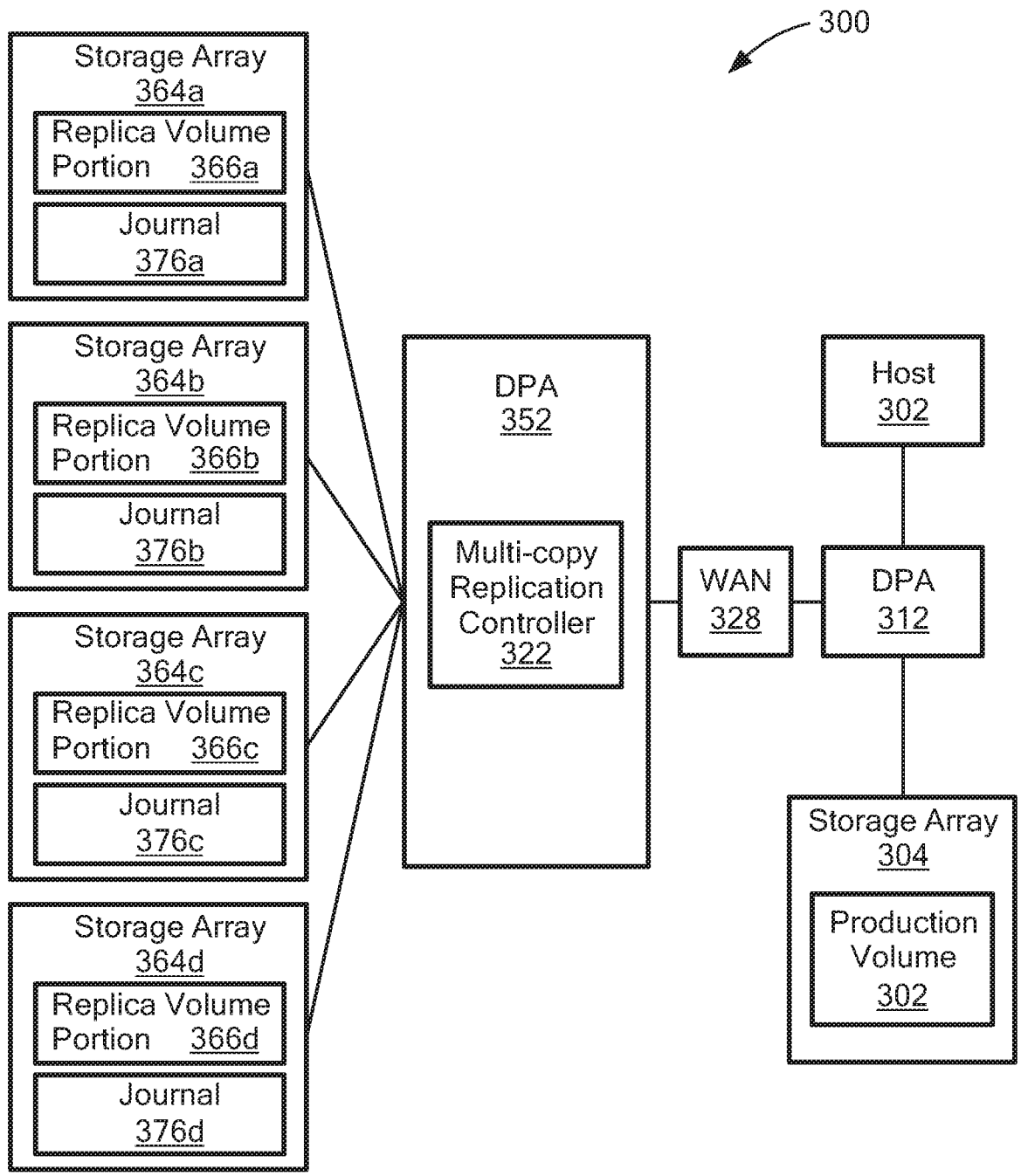
FIG. 3A is a block diagram of an example of a data protection system configured to perform multi-copy replication, according to one embodiment of the disclosure.

Referring to FIG. 3A, a system 300 is an example of a data protection system configured to perform multi-copy replication, according to one embodiment of the disclosure.

In one example, the system 300 may include a host 302, a storage array 304, a DPA 312, a DPA 352 connected to the DPA 312 by a WAN 328 and storage arrays (e.g., storage array 364a-364d). The storage array 304 may include a production volume 302. In one example, the DPAs 312, 352 are similar to DPAs 112, 124, respectively. Each storage array 364a-364d may include a portion of a copy of the production volume 302 (e.g., a storage array 364a may include a replica volume portion 366a, a storage array 364b may include a replica volume portion 366b, a storage array 364c may include a replica volume portion 366c and a storage array 364d may include a replica volume portion 366d). In one example, each replica volume portion 364a-364d may be a volume but the size of each of the volumes may be smaller than the primary volume 302.

In the example embodiment of FIG. 3A, each storage array 364a-364d may include a journal (e.g., the storage array 364a may include a journal 376a, the storage array 364b may include a journal 376b, the storage array 364c may include a journal 376c and the storage array 364d may include a journal 376d). Since each replica volume portion 366a-366d includes a portion of a full replica volume, each of the journals 376a-376d are independent from each other. In one particular example, consistent bookmarks across the journals 376a-376d may be used to allow restoration of a production volume 302 at a selected point-in-time.

In the example embodiment of FIG. 3A, the DPA 352 may include a multi-copy replication controller 322 configured to distribute data from a volume over multiple replica volume portions 366a-366d. As will be further described herein, rather than save a copy of a full replica volume on each of the storage arrays 364a-364d, a portion of a full replica volume is saved on each storage array 364a-364d so that a subset (e.g., less than a total number) of the replica volume portions 376a-376d may be used to access any portion of a full replica volume.

In one example, each of the journals 376a-376d may include a DO stream, a DO METADATA stream, an UNDO stream and an UNDO METADATA as described with respect to FIG. 2.

In one example, data received by the multi-copy replication controller 322 is sent to replica volume portions 364a-364d using a coding process which may include, for example, erasure codes, RAID (Redundant Array of Independent Disks) processes and so forth. In one particular example, the techniques to distribute replica volume data may be similar to approaches described in U.S. Pat. No. 9,063,910, issued Jun. 23, 2015, entitled "DATA RECOVERY AFTER TRIPLE DISK FAILURE;" U.S. Pat. No. 9,026,729, issued May 5, 2015, entitled "DATA RECOVERY AFTER TRIPLE DISK FAILURE;" and U.S. Pat. No.

8,990,495, issued Mar. 24, 2015, entitled "METHOD AND SYSTEM FOR STORING DATA IN RAID MEMORY DEVICES," each of which are assigned to the same assignee as the present patent application. All applications in this paragraph are incorporated herein by reference in their entirety.

In one particular example, replica volume portions 366a-366d may form a full replica volume under (4,2) MDS (maximum distance separable) erasure code (i.e., at least two replica volume portions of the four replica volume portions are needed to form a full replica volume). In this example, each replica volume portion 366a-366d will be half of the size of the primary volume 302, and the total of the four replica volume portions 366a-366d will have twice the size of the primary volume 302 allowing recovery from any two available sites.

Figure 3B:
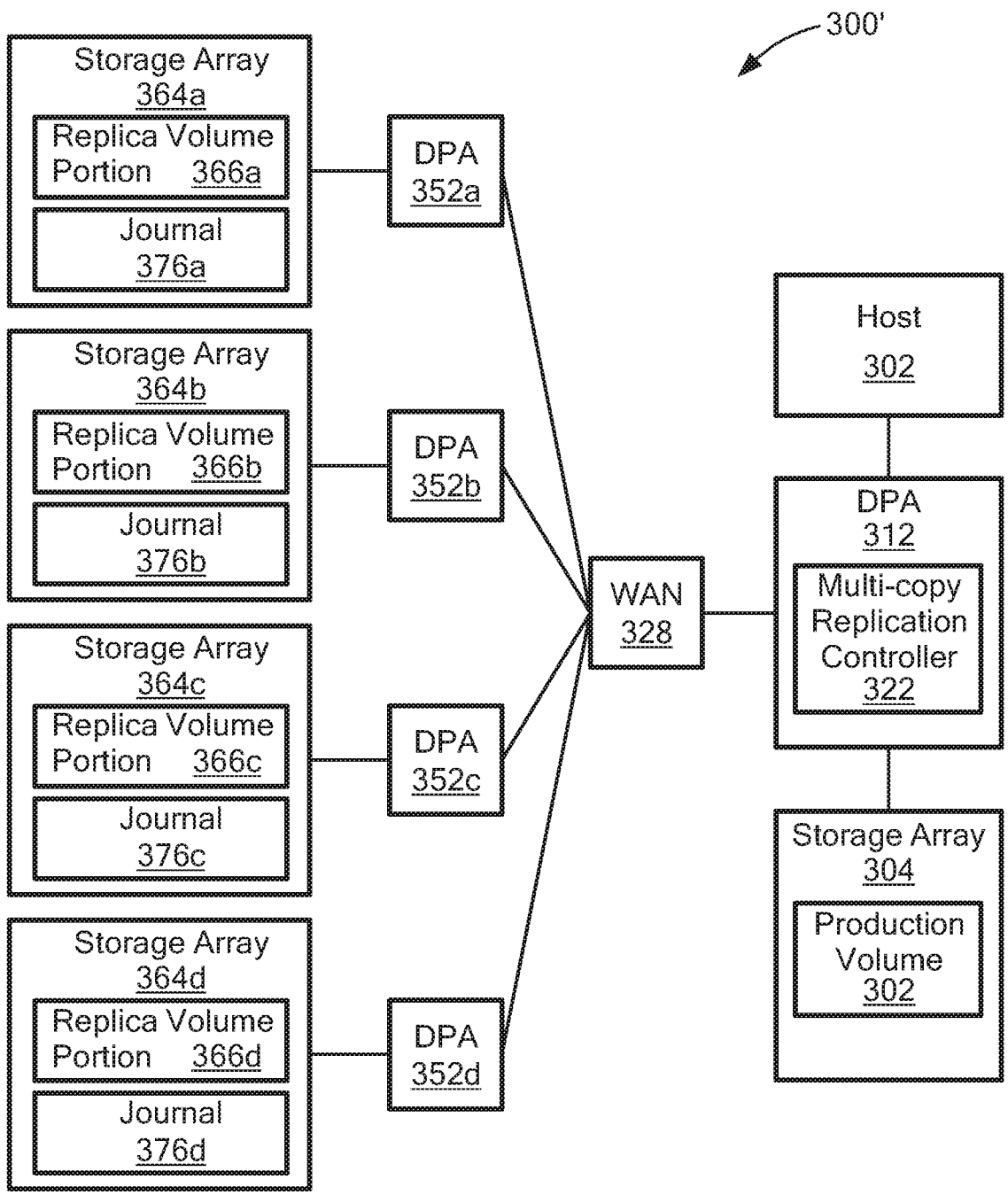
FIG. 3B is a block diagram of another example of a data protection system configured to perform multi-copy replication, according to one embodiment of the disclosure.

Referring to FIG. 3B, a system 300' that is another example of a system to perform multi-copy replication, according to one embodiment of the disclosure. The system 300' is similar to the system 300 except, for example, the DPA 352 is replaced with DPAs 352a-352d. In another example, the DPAs 352a-352d may be located at different sites. In one example, a site may be a cloud network or other storage network. In the example embodiment of FIG. 3B, the multi-copy controller 312 may be disposed at the production DPA 312. In other examples, each of the DPAs 352a-352d may include a multi-copy replication controller.

Referring to FIG. 4, a diagram 400 is a simplified block diagram of one particular example to distribute replica volume data over multiple replica volume portions, according to one embodiment of the disclosure. In one particular example, a block of data, A, represents a block of data to be replicated from the production volume 302. The block of data, A, may be split into two equal data portions, $X_1$ and $X_2$. In one particular example of using erasure codes, data $A_1$ may be equal to data portion $X_1$; data $A_2$ may be equal to data portion $X_2$; data $A_3$ may be a function of portions $X_1$, and $X_2$ using Reed-Solomon erasure codes and data $A_4$ may be a function of portions $X_1$ and $X_2$ using Reed-Solomon erasure codes.

In one particular example, the data $A_1$ is sent to the replica volume portion 366a, the data $A_2$ is sent to the replica volume portion 366b, the data $A_3$ is sent to the replica volume portion 366c and the data $A_4$ is sent to the replica volume portion 366d.

Referring to FIG. 5, a process 500 is an example of a process to perform multi-copy replication, according to one embodiment of the disclosure.

Process 500 may receive data from a write command (502). For example, a write command to write to the production volume 302 is received by the multi-copy replication controller 322.

Process 500 may distribute data from the write command (506). For example, the multi-copy replication controller 322 distributes data from the write command to the replica volume portions 366a-366d using a coding process, which may include, for example, erasure codes, and so forth. In another example, the offsets of the I/Os (or the write command) may also be changed accordingly. In this example, since the size of a replica volume portion is half of the production volume, every I/O is directed at a new offset with a new size (e.g., the offset is half of the offset of the original I/O, and the size is the half the size of the original I/O size). In some examples, if the I/O size is not at the size of two storage block, a portion of data from the primary storage 302 is read to obtain an I/O which is at least size of the two blocks and has an even offset. In other examples if each replica has a portion of the disk requiring dividing the data to n pieces, the system may need assure that each data piece replicated has a size which is a multiple of n and a starting offset which is a multiple of n.

Process 500 may generate bookmarks (512). For example, a bookmark may be generated in each of the journals 376a-376d after data from each write command is stored.

Figure 6:
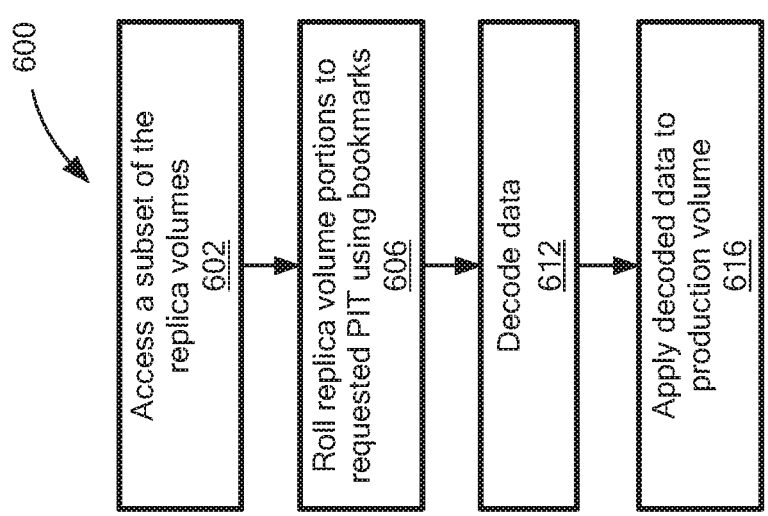
FIG. 6 is a flowchart of an example of a process to recover a production volume to a selected point-in-time, according to one embodiment of the disclosure.

Referring to FIG. 6, a process 600 is an example of a process to recover a production volume to a selected point in time, according to one embodiment of the disclosure.

Process 600 may access a subset of the replica volume portions (602). For example, the multi-copy replication controller 322 may receive a request to access a selected point-in-time and may access a subset of replica volume portions 366a-366d required to reproduce data to a production volume 302 for the selected point-in-time. Process 600 rolls the replica volume portions to the requested point-in-time using bookmarks (606). For example, the multiple journal controller 322 accesses the subset of the replica volumes portions 366a-366d and rolls back each accessed replica volume portion to the selected point-in-time by using the bookmark in the respective journal.

Process 600 may decode data (612) and may apply the decoded data to the production volume 312. For example, the subset of replica volume portions 366a-366d accessed may be decoded by the multi-copy replication controller 322 and may be written to the production volume 302. In one example, decoding data includes decoding data coded using the coding process and may include decoding an erasure code, a RAID implementation and so forth.

Figure 7:
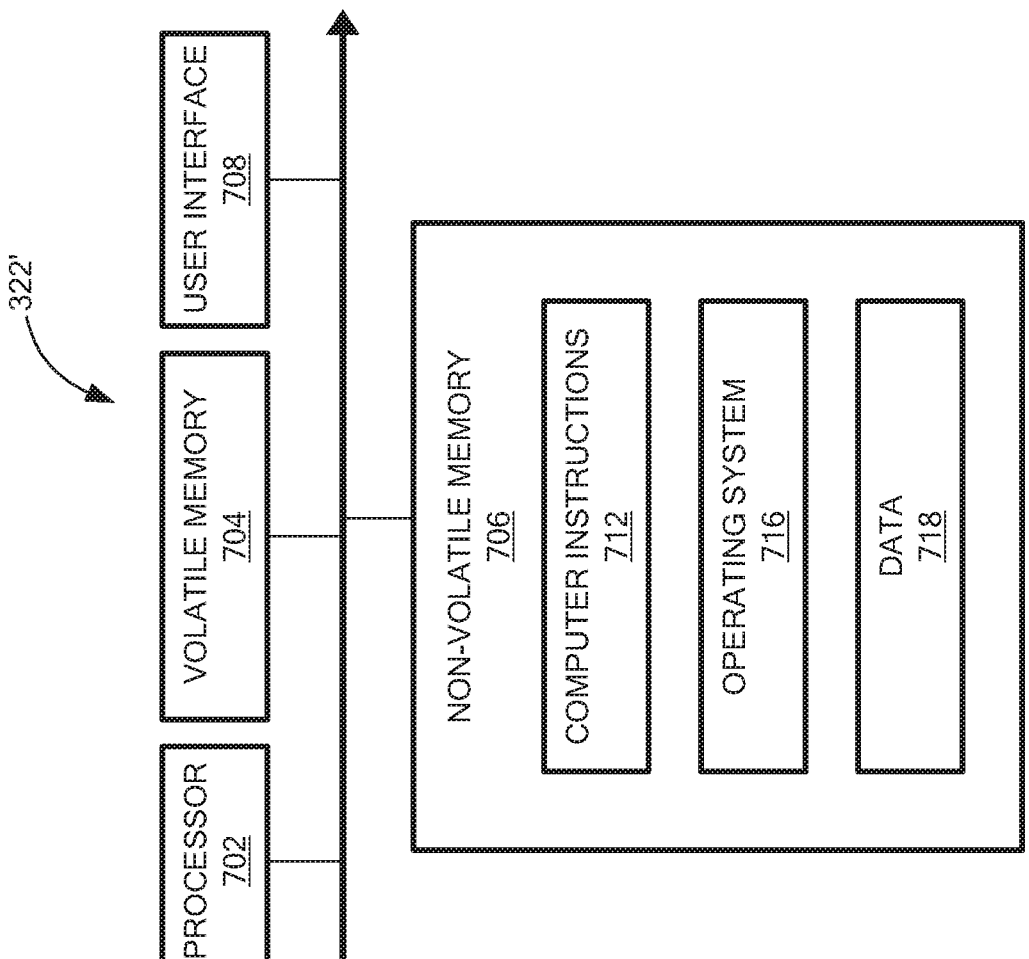
FIG. 7 is a computer on which any portion of the processes of FIGS. 5 and 6 may be implemented, according to one embodiment of the disclosure.

Referring to the example embodiment of FIG. 7, in one example, the multi-copy replication controller 322 may be the multi-copy replication 322'. The multi-copy replication controller 322' may include a processor 702, a volatile memory 704, a non-volatile memory 706 (e.g., hard disk, flash memory) and the user interface (UI) 708 (e.g., a graphical user interface, a mouse, a keyboard, a display, touch screen and so forth). The non-volatile memory 706 may store computer instructions 712, an operating system 716 and data 718. In one example, the computer instructions 712 may be executed by the processor 702 out of volatile memory 704 to perform at least a portion of the processes described herein (e.g., processes 500 and 600).

The processes described herein (e.g., processes 500 and 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 500 and 600 are not limited to the specific processing order of FIGS. 5 and 6. Rather, any of the processing blocks of FIGS. 5 and 6 may be re-ordered, combined or removed, performed in parallel or in serial, as necessary, to achieve the results set forth above.

The processing blocks (for example, in the processes 500 and 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
    replicating a production volume across a plurality of replica volume portions, each replica volume portion stored on a different storage array of a plurality of storage arrays, and each replica volume portion having a journal that is stored with the respective replica volume portion at the corresponding storage array, wherein each of the journals manages activities for its corresponding replica volume portion the replicating comprising:
    distributing data from a write command to the production volume across the replica volume portions using a coding scheme, wherein a subset of the replica volume portions, less than a total number of the replica volume portions, includes data to recreate a full replica volume of the production volume;
    wherein distributing the data comprises distributing data blocks to the replica volume portions and changing an offset and size of input/output (I/O) requests that are sent to a replica site according to the coding scheme, the distributing data blocks to the replica volume portions further comprises reading the data from a primary storage to align and size the data before the coding scheme to enable coded data to be a multiple of a block size;
    wherein the offset of the I/O requests that are sent to the replication site, is half an offset of I/O to the production volume;
    wherein the size of the I/O requests that are sent to the replication site, is half a size of the I/O to the production volume;
    wherein, for each of the plurality of replica volume portion having a portion of the plurality of storage arrays requiring the data to be divided into n pieces, configuring each of the n pieces to have a size that is a multiple of n and a starting offset that is a multiple of n.

2. The method of claim 1, wherein distributing the data from the write command across the replica volume portions using the coding scheme comprises distributing the data from the write command across the replica volume portions using erasure codes.

3. The method of claim 1, wherein distributing the data from the write command across the replica volume portions using the coding scheme comprises distributing the data from the write command across the replica volume portions using a RAID (Redundant Array of Independent Disks) process.

4. The method of claim 1, further comprising marking each of the journals with a book mark, the book mark configured to be applied consistently across the journals to restore the production volume at a selected point-in-time.

5. The method of claim 4, further comprising restoring the production volume to the selected point-in-time comprising:
    accessing the subset of replica volume portions;
    rolling the subset of replica volume portions to the selected point-in-time;
    decoding the distributed data from the subset of replica volume portions; and writing the decoded data to the production volume.

6. The method of claim 1, wherein the replica volume portions collectively form a full replica volume under maximum distance separable (MDS) code (4,2) and a size of each replica volume portion is half of a size of the production volume.

7. The method of claim 1, wherein data associated with the write command is entered into a corresponding one of the journals, the data associated with the write command including a time stamp indicating a date and time the write command is received a production side data protection appliance, a write size of the write command, a location in the storage array where data of the write command is to be written, and data of the write command.

8. An apparatus, comprising:
    electronic hardware circuitry configured to:
    replicate a production volume across a plurality of replica volume portions, each replica volume portion stored on a different storage array of a plurality of storage arrays, and each replica volume portion having a journal that is stored with the respective replica volume portion at the corresponding storage array, wherein each of the journals manages activities for its corresponding replica volume portion;

wherein the electronic hardware circuitry configured to replicate the production volume comprises circuitry configured to distribute data from a write command to the production volume across the replica volume portions using a coding scheme, wherein a subset of the replica volume portions, less than a total number of the replica volume portions, includes data to recreate a full replica volume of the production volume, and wherein distributing the data comprises distributing data blocks to the replica volume portions and changing an offset and size of input/output (I/O) requests that are sent to a replica site according to the coding scheme, the distributing data blocks to the replica volume portions further comprises reading the data from a primary storage to align and size the data before the coding scheme to enable coded data to be a multiple of a block size;

wherein the offset of the I/O requests that are sent to the replication site, is half an offset of I/O to the production volume;

wherein the size of the I/O requests that are sent to the replication site, is half a size of the I/O to the production volume;

wherein, for each of the plurality of replica volume portion having a portion of the plurality of storage arrays requiring the data to be divided into n pieces, configuring each data of the n pieces to have a size that is a multiple of n and a starting offset that is a multiple of n;

wherein the electronic hardware circuitry comprises at least one of a processor, a memory, a programmable logic device or a logic gate.

9. The apparatus of claim 8, wherein the electronic hardware circuitry configured to distribute the data from the write command across the replica volume portions using the coding scheme comprises distributing the data from the write command across the replica volume portions using erasure codes.

10. The apparatus of claim 8, wherein the electronic hardware circuitry configured to distribute the data from the write command across the replica volume portions using the coding scheme comprises distributing the data from the write command across the replica volume portions using a RAID (Redundant Array of Independent Disks) process.

11. The apparatus of claim 8, further comprising the electronic hardware circuitry configured to mark each of the journals with a book mark, the book mark configured to be applied consistently across the journals to restore the production volume at a selected point-in-time.

12. The apparatus of claim 11, further comprising the electronic hardware circuitry configured to restore the production volume to the selected point-in-time comprises:
accessing the subset of replica volume portions;
rolling the subset of replica volume portions to the selected point-in-time;
decoding the distributed data from the subset of replica volume portions; and writing the decoded data to the production volume.

13. The system of claim 8, wherein the circuitry comprises a controller and a data protection appliance that reside between the storage arrays and a host system that manages the production volume.

14. An article comprising:
a non-transitory computer-readable medium that stores computer-executable instructions, the instructions causing a machine to:
replicate a production volume across a plurality of replica volume portions, each replica volume portion stored on a different storage array of a plurality of storage arrays, and each replica volume portion having a journal that is stored with the respective replica volume portion at the corresponding storage array, wherein each of the journals manages activities for its corresponding replica volume portion;

wherein the instructions causing the machine to replicate the production volume comprise instructions causing the machine to distribute data from a write command to the production volume across the replica volume portions using a coding scheme, and wherein a subset of the replica volume portions, less than a total number of the replica volume portions, includes data to recreate a full replica volume of the production volume;

wherein distributing the data comprises distributing data blocks to the replica volume portions and changing an offset and size of input/output (I/O) requests that are sent to a replica site according to the coding scheme, the distributing data blocks to the replica volume portions further comprises reading the data from a primary storage to align and size the data before the coding scheme to enable coded data to be a multiple of a block size;

wherein the offset of the I/O requests that are sent to the replication site, is half an offset of I/O to the production volume;

wherein the size of the I/O requests that are sent to the replication site, is half a size of the I/O to the production volume;

wherein, for each of the plurality of replica volume portion having a portion of the plurality of storage arrays requiring the data to be divided into n pieces, configuring each of the n pieces to have a size that is a multiple of n and a starting offset that is a multiple of n.

15. The article of claim 14, wherein the instructions causing the machine to distribute the data from the write command across the replica volume portions using the coding scheme comprise instructions causing the machine to distribute the data from the write command across the replica volume portions using erasure codes.

16. The article of claim 14, wherein the instructions causing the machine to distribute the data from the write command across the replica volume portions using the coding scheme comprise instructions causing the machine to distribute the data from the write command across the replica volume portions using a RAID (Redundant Array of Independent Disks) process.

17. The article of claim 14, further comprising instructions causing the machine to mark each of the journals with a book mark, the book mark configured to be applied consistently across the journals to restore the production volume at a selected point-in-time.

18. The article of claim 17, further comprising instructions causing the machine to restore the production volume to the selected point-in-time comprising instructions causing the machine to:
access the subset of replica volume portions;
roll the subset of replica volume portions to the selected point-in-time;

decode the distributed data from the subset of replica volume portions;
and write the decoded data to the production volume.

\* \* \* \* \*